Figure 1:
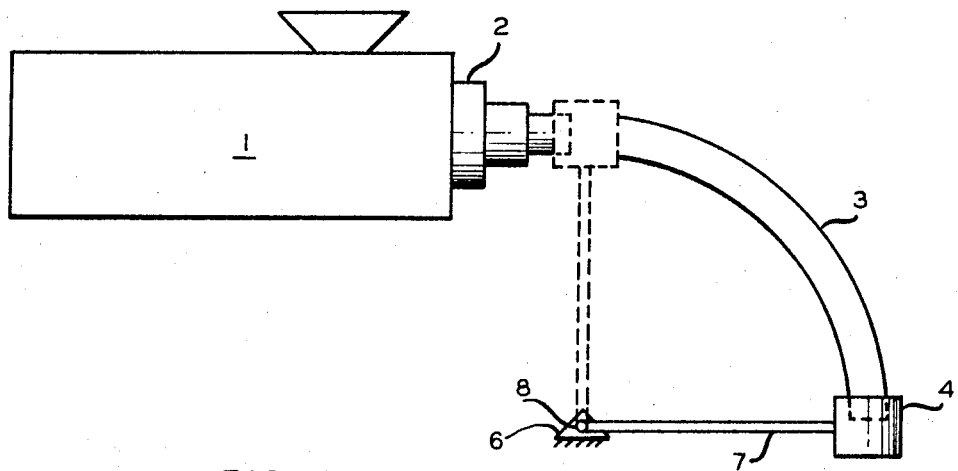

United States Patent [19]

Williams et al.

[11] 3,748,077

[45] July 24, 1973

[54] APPARATUS FOR PRODUCING PIPE HAVING A BEND

[75] Inventors: George E. Williams; Olaf E. Larsen, both of Bartlesville, Okla.

[73] Assignee: Phillips Petroleum Company, Bartlesville, Okla.

[22] Filed: May 19, 1969

[21] Appl. No.: 825,537

Related U.S. Application Data

[62] Division of Ser. No. 497,365, Oct. 18, 1965, Pat. No. 3,497,588.

[52] U.S. Cl. ............................. 425/317, 425/325
[51] Int. Cl. ......................... B29f 3/00, B39g 2/00
[58] Field of Search.................... 425/325, 337, 380, 425/317, 181, 392

[56] References Cited

UNITED STATES PATENTS

| | | | |
|---|---|---|---|
| 2,649,642 | 8/1953 | Petresky | 425/181 |
| 975,062 | 11/1910 | Myers | 425/380 |
| 3,508,293 | 5/1950 | Powell | 425/262 |
| 3,425,092 | 2/1969 | Taga | 425/442 X |

Primary Examiner—J. Spencer Overholser
Assistant Examiner—Michael O. Sutton
Attorney—Young & Quigg

[57] ABSTRACT

An extrudate for a bend is produced by extruding thermoplastics and constraining the extrudate in a predetermined path to produce a desired bend.

5 Claims, 2 Drawing Figures

Patented July 24, 1973  3,748,077

INVENTORS
G. E. WILLIAMS
O. E. LARSEN
BY
ATTORNEYS

APPARATUS FOR PRODUCING PIPE HAVING A BEND

This is a division of application Ser. No. 497,365, filed Oct. 18, 1965, now U.S. Pat. No. 3,497,588.

This invention relates to the production of an extrudate from plastic materials. In one aspect, this invention relates to apparatus for extruding a thermoplastic material to produce an extrudate having a bend therein. In another aspect, this invention relates to methods of fashioning a bend in a tube or a pipe formed by extruding a thermoplastic material.

In the fabrication of hollow extrudates such as pipes or tubes from thermoplastic materials it is desirable for the final product to have a uniform wall thickness. The presence of uneven or thin spots in the walls of a plastic pipe is undesirable not only from the standpoint of structural weakness but also from the standpoint that the flexibility of the pipe varies over its length.

A conventional method of the prior art for putting a bend in a plastic pipe involves heating the pipe in a glycol bath until the plastic reaches a temperature at which it becomes pliable. The pipe is then removed from the bath, bent into the shape desired, and cooled in this position. A shortcoming of major concern associated with this method is that the pipe wall on the inside portion of the bend becomes wrinkled and uneven. The wrinkles cause a pressure drop when a pipe with a bend formed in the conventional manner is used to transmit a fluid due to the turbulence set up as a result of the reduction in cross section of the pipe. The pipe wall on the outside portion of the bend is stretched due to the bending action. This stretching causes the plastic to flow thereby reducing the wall thickness of the pipe with the net result that the strength of the pipe in the vicinity of the bend is greatly reduced.

According to this invention, these and other disadvantages of the prior art methods of producing a bend in an extrudate are overcome by means of a method and apparatus which serves to produce an extrudate having a bend with a substantially uniform wall thickness in all areas of the bend. This is accomplished by extruding a thermoplastic material through an annular die of an extruding apparatus to form a pipe and constraining the pipe over a portion of its cross section by applying a force thereto in a direction opposite to the direction of travel of the pipe as it travels from the extruder. The force applied to the portion of the cross section of the pipe causes it to bend toward the side of the pipe to which the force is applied. The method of this invention can be practiced by means of an apparatus which functions in cooperation with a conventional extruder wherein the extrusion solidifies just prior to exiting from the die. The apparatus serves to apply a force against a portion of the cross section of the pipe being extruded such that it constrains the pipe with the net result being that the pipe is pulled around a radius as it travels from the extruder. The force exerted produces a resistance to flow on the approximate inner one-half of the cross section of the pipe as it travels from the extruder. This causes the thermoplastic material issuing from the side of the die opposite to the side of the die having the force applied thereto to travel from the dip at a slightly greater rate than the side being constrained. The relative rate of travel of the two portions of the pipe through the annular die produces a bend in the pipe. The rate of flow of the thermoplastic material through the annular die increases around the die annulus from the portion forming the inner surface to the portion forming the outer surface of the pipe bend. The wall thickness in the bend is substantially uniform because by bending the pipe in this manner there is molten thermoplastic material available to compensate for the increased amount required to form the outside portion of the bend with the same thickness as the inside portion of the bend.

Accordingly, it is an object of this invention to provide an improved method of and apparatus for forming a pipe having a bend therein.

Another object of this invention is to provide a method of and apparatus for producing a uniform wall thickness in a pipe bend.

Still another object of the invention is to produce a pipe bend having uniform strength and flexibility characteristics.

Figure 2:
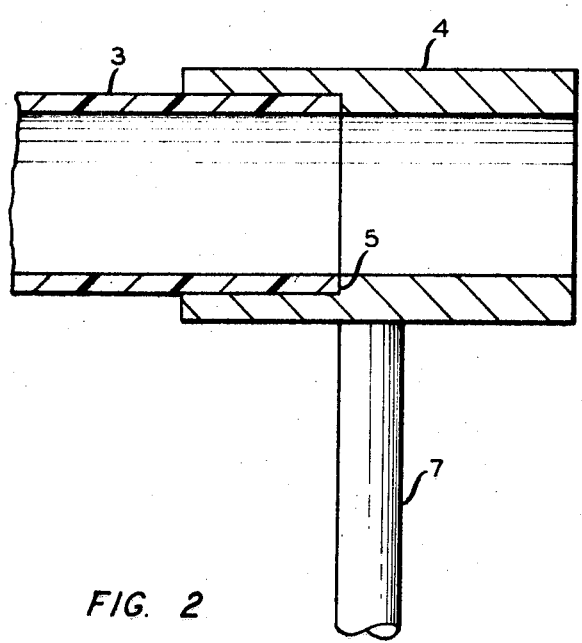

These and other objects of the invention will become apparent to one skilled in the art after studying the following detailed description, the appended claims, and the accompanying drawing wherein:

FIG. 1 is a diagrammatic illustration of an extruding apparatus and the pipe bending apparatus of this invention; and FIG. 2 is a detailed view of the collar of the bending apparatus illustrating the end of an extruded pipe therein.

Referring now to the drawing, wherein like reference numerals are used to denote like elements, the invention will be described in more detail. An extrusion means including an extruder 1 is provided with a nozzle in the form of an annular die 2 which functions to form a thermoplastic material into a pipe 3. The extruder 1 is preferably of the reciprocating plunger type as disclosed in copending, commonly assigned application Ser. No. 407,584, filed Oct. 29, 1964, now U.S. Pat. No. 3,392,224.

The pipe bending means of this invention includes a cylindrical-shaped collar 4 for receiving the end of pipe 3 as it leaves the extruder 1. The collar 4 is provided with a shoulder 5 against which the end of pipe 3 can abut. A support 6 located to the side of the extruder 1 has an arm 7 pivotally connected to the support 6 by means of a pin 8. The end of arm 7 opposite to the end connected by pin 8 is secured to the collar 4 by any convenient means such as welding or the like.

In the operation of the apparatus of this invention, a material capable of becoming plastic upon the application of heat is charged to the extruder 1 whereupon it is forced through the annular die 2 into the shape of pipe 3. The pipe bending means is positioned as indicated by the dotted lines in FIG. 1 such that the collar 4 will receive the end of pipe 3 against shoulder 5. AS the extrusion operation continues, the pipe bending means including the collar 4 and arm 7 serve to pull or carry the end of the pipe 3 through an arc as indicated by the drawing. This serves to constrain the pipe 3 over approximately one-half its cross section by applying the force obtained from the action of the collar to the inside portion of the pipe bend. This force is applied in a direction opposite to the direction of travel of the pipe as it moves from the annular die 2.

Since the pipe is being constrained along its inner portion, the resistance to flow of the molten thermoplastic material in the die is established over that inner portion. Conversely, the outer portion of the pipe bend travels more freely as it leaves the annular die 2 with the effect that the molten polymer is supplied to the outer portion of the pipe at a relatively higher rate thus providing sufficient material to compensate for that required to achieve a pipe bend having the same wall thickness on the outer portion of the pipe bend as the wall thickness on the inner portion of the bend. This results in the production of a pipe of uniform wall thickness in all areas of the bend. A straight section of pipe is generally formed on each end of the bend by extruding the pipe a short distance before the bend is made. This straight section provides a square end which can be used to attach the pipe to other sections of pipe. When it is desirous to produce a long section of pipe before the bend is made, the collar 4 can be changed to a clamp which can be opened to accomodate the pipe.

It is obvious that any thermoplastic material such as a natural or synthetic resin can be used in the practice of this invention. Exemplary materials which can be extruded into pipe in accordance with this invention include polyolefins, polyamides, polyesters, fluorocarbon polymers, acetal resin, polycarbonates, vinyl polymers, acrylic polymers, polystyrene, and the like. Olefin polymers such as polyethylene and ethylene-butene copolymers of a molecular weight in excess of 100,000 are particularly suited for extrusion in accordance with this invention.

The following example will serve to illustrate the invention. It is to be understood that such example is for that purpose only and must not be considered to be limiting of the invention.

EXAMPLE

Polyethylene having a density of 0.94 (ASTM D1505-60T) and a high load melt index of 1.5 (ASTM D1238-62T, Condition F) was prepared in accordance with the method disclosed in British Pat. No. 853,414. A mixture was formed by compounding the polymer with 2178 weight per cent carbon black and 1 weight per cent glycerin. The mixture was then extruded into a 4-inch pipe using a 60-ton reciprocating ram-type extruder having a die with a land such that the extrudate solidified before emerging from the die. The temperature of the mixture was 500° F. as it entered the die. Cooling water at a temperature between 140° to 150° F. was employed to cool the die.

The pipe bending means constructed in accordance with this invention included a clamp in the form of a collar connected to a 24-inch arm. The arm was pivotally connected to a support situated laterally with respect to the direction of extrusion of the pipe. The 4-inch pipe was extruded at a rate of 8 inches per minute into the clamp such that the pipe was pulled into a bend having a 24-inch radius. after the arm including the clamp and pipe had been moved slightly more than 90°, the clamp was removed. The pipe bend was allowed to relax whereupon it assumed a permanent bend of 90° having a 30-inch radius.

As hereinbefore indicated, the force applied to the cross section of the extrudate causes the bend to form toward that portion of the extrudate which has the force applied thereto. Though not intended to be bound by any theory, it is likely that there is almost no constraining force on the outermost portion of the extrudate in the bend. Conversely, it is likely that the constraining force is at a maximum at the innermost portion of the extrudate in the bend. Thus, the constraining force can be considered as a multitude of individual forces which vary in magnitude from a maximum to a minimum in moving across the cross section of the extrudate from the innermost portion to the outermost portion of the bend. The desired resultant force of the multitude of individual forces can be obtained by applying a force at a particular point on the cross section of the extrudate. Thus, the force applied at that point at the end of the bend will produce the bend desired in the extrudate by guiding the point through a predetermined path.

Although the invention has been described in connection with bending a pipe, it is obvious that it can be used in connection with bending any shape extrusion. For example, the invention can be used in bending extrusions having rectangular and square shapes. The invention is particularly suited for bending rectangular or other cross sectional shapes wherein there is a partition extending longitudinally with the extrusion.

Although the invention has been described in considerable detail, it is to be understood that such detail is for that purpose only and that many variations and modifications can be made by one skilled in the art without departing from the spirit and scope of the invention.

We claim:

1. In an apparatus for producing extrudate from thermoplastic material including extrusion means for forming a thermoplastic material into an extrudate, the improvement comprising means associated with said extrusion means for gripping said extrudate to constrain the travel of said extrudate to effect a bend therein, said means for gripping and constraining said extrudate to effect a bend therein includes a collar for receiving the end of said extrudate, a support, and an arm pivotally attached to said support and said collar.

2. Apparatus according to claim 1 wherein said extrudate is pipe, and wherein said collar is cylindrical.

3. An apparatus for bending pipe into curves which is being extruded from an extruding device comprising:
   a former member for contacting and gripping the end of a straight pipe being extruded from said extruder device, and
   means for moving said former member downwardly and away from said extruder in an arcuate path so as to carry and bend said straight pipe into a curve as determined by the arcuate path of movement of the former member.

4. The apparatus of claim 3 wherein said moving means includes a movable frame means, said frame means having a first end which is pivotally attached to a base frame and a second end which is free to move about the point of pivotal attachment.

5. The apparatus of claim 4 wherein said former member is carried by the second end of said movable frame, whereby the former member can be swung in an arcuate path determined by the position of said former member relative to said point of pivotal attachment.

* * * * *